United States Patent [19]

Yosefi

[11] Patent Number: 5,649,220

[45] Date of Patent: Jul. 15, 1997

[54] SYSTEM AND METHOD FOR ARTWORK DESIGN AND PRODUCTION

[75] Inventor: Hanan Yosefi, Ganei Tikva, Israel

[73] Assignee: Scitex Corporation Ltd., Israel

[21] Appl. No.: 120,204

[22] Filed: Sep. 9, 1993

[30]    Foreign Application Priority Data

Aug. 24, 1993 [IL] Israel ........................................ 106792

[51] Int. Cl.$^6$ ...................................................... G06F 15/00
[52] U.S. Cl. ............................................ 395/788; 395/779
[58] Field of Search .................................... 395/145–148, 395/149, 150, 151, 152, 153, 154, 155, 161, 761, 779, 788, 789

[56]    References Cited

U.S. PATENT DOCUMENTS

| | | | |
|---|---|---|---|
| 4,723,209 | 2/1988 | Hernandez et al. | 395/147 |
| 4,937,743 | 6/1990 | Rassman et al. | 364/401 |
| 5,179,637 | 1/1993 | Nardozzi | 395/114 |
| 5,287,194 | 2/1994 | Lobiondo | 358/296 |
| 5,392,430 | 2/1995 | Chen et al. | 395/650 |

FOREIGN PATENT DOCUMENTS

0475734A3  3/1992  European Pat. Off. .

OTHER PUBLICATIONS

The Best Book of WordPerfect, First Edition, Seventh Printing 1988.

Battelle et al., "Planning for 1995: the future is now", Corporate Computing, v. 1, n. 6, p. 166(5). Dec. 1992.

Petaccia, "Batch files on the Mac?", Computer Shopper, v. 12, n. 9, p. 746(4). Sep. 1992.

Custer, "Frontier opens the way to a user–controlled Mac", MacWEEK, v. 6, n. 9, p. 33(2). Mar. 1992.

"North Atlantic Publishing", The Seybold Report on Publishing Systems, v. 22, n. 14, p. S27. Apr. 1993.

Rooney, "Mac tools automate image compression", PC Week, v. 9, n. 41, p. 40. Oct. 1992.

McManus, "QuarkXPress 3.2 gets color in tune: update adds EftColor, supports Apple events", MacWEEK, v. 7, n. 27, p. 22. Jul. 1993.

Norr, "UserLand adds hooks for externals, Object Model support to Frontier", MacWEEK, v. 6, n. 37, p. 4. Oct. 1992.

Parkinson, "PixelPaint Pro3 to pour on features: upgrade will offer layers, scripting", MacWEEK, v. 7, n. 31, p. 36(2). Aug. 1993.

Cline et al., "Seybold Paris '93: contemporary issues from a European perspective", The Seybold Report on Publishing System, v. 22, n. 19, p. 8(21). Jun. 1993.

"Aldus to acquire Compumation; sets high–end integration and custom–software strategy", The Seybold Report on Desktop Publishing, v. 8, n. 7, p. 25. Mar. 1994.

Schroeder, "Aldus taking digital route to interactive publishing", PC Week, v. 11, n. 4, p. 1(2). Jan. 1994.

(List continued on next page.)

*Primary Examiner*—Heather R. Herndon
*Assistant Examiner*—Joseph R. Burwell
*Attorney, Agent, or Firm*—Skjerven, Morrill, MacPherson, Franklin & Friel

[57]    ABSTRACT

A system and method for artwork design and production which an artwork preparation administrator and a plurality of operation units each of which performs at least one of a multiplicity of different artwork preparation tasks. The administrator includes a workflow manager and a workflow definition unit for managing the production of a user-defined workflow having a multiplicity of artwork preparation tasks. The workflow manager includes a) apparatus for initiating operation of selected operation units, b) apparatus for receiving and processing task information from the selected operation units when they perform one of the artwork preparation tasks and c) apparatus for producing a process list. The process list includes processed task information from at least one of the artwork preparation tasks and is ordered in accordance with a portion of the workflow which has at least one artwork preparation task therein.

2 Claims, 18 Drawing Sheets

OTHER PUBLICATIONS

Aldus Open Prepress Environment (OPEN) (V. 1.0), Computer Select—Software Product Specification. Dec. 1994.

"*Kaleida Labs Launches Worldwide Developer Program,*" First, Individual Inc., Cambridge, MA, Jun. 24, 1993.

"*Kaleida Puts Off Release of Scriptx,*" First, Individual Inc., Cambridge, MA, May 3, 1993.

"*Kaleida Set to Launch Scriptx,*" First, Individual Inc., Cambridge, MA, Jun. 22, 1993.

"*Kaleida Labs Announces Manufacturers' Alliance/Charter Members Named,*" First, Individual Inc., Cambridge, MA, May 25, 1993.

"*Kaleida Selects Ready Systems' Spectra Cross-Development Environment for Development of a Multimedia Run-Time Environment,*" First, Individual Inc., Cambridge, MA, Apr. 7, 1993.

"*\*\*\*\*First Look at Scriptx—How Good Is It,*" First, Individual Inc., Cambridge, MA, Jun. 28, 1993.

"*Kaleida to Take Wraps Off Scriptx Language,*" First, Individual Inc., Cambridge, MA, Apr. 14, 1993.

"*Kaleida Offers Scriptx as Multimedia Standard,*" First, Individual Inc., Cambridge, MA, May 10, 1993.

"*Movieworks Creates Quicktime Movies on MAC,*" First, Individual Inc., Cambridge, MA, Mar. 15, 1993.

"Breakthrough to a New World of Imaging Power," Alias Research, Inc., 1993.

"Adobe™ Acrobat™ Products and Technology," Backgrounder, Adobe Systems Incorporated, Apr. 1993.

Anonymous, "Computer Assisted Process for the Checking and Fabrication of Integrated Circuit Chip Masks", IBM Technical Disclosure Bulletin, vol. 10, No. 8, Jan. 1968 New York, US, pp. 1329–1330.

Scott-Taggart M., "*Digital Proofing*", Desktop Publishing Commentary, Mar. 1993, UK, vol. 8, No. 9, ISSN 0957–3178, pp. 1, 6–9.

Anonymous, "*Propagation of Resource Values during Edit of User Interface*", Reasearch Disclosure, No. 340, Aug. 1, 1992, p. 596.

Scan Dialog

| | | | |
|---|---|---|---|
| Media: | Positive | Mode: | Color |
| Format: | T 6 x 7 | | |
| Scan Type: | Transparent | | |

Crop

| | | | |
|---|---|---|---|
| Height: | 3.71 | Width: | 3.71 |

Scale: 100  ☐ Mirrored

Scan

| | | | |
|---|---|---|---|
| Height: | 3.711 | Width: | 3.711 |
| Resolution: | 300 | | DPI |
| Units: | Inches | | |

| | | |
|---|---|---|
| End Points: | Automatic | Edit... |
| Gradation: | G_Default@ | Edit... |
| Sharpness: | S_Default@ | Edit... |
| Color Table: | C_Default@ | Edit... |

[Apply] [Pre-Scan] [Preview] [Scan ...]

FIG. 6A

| Darkness | C | M | Y | K |
|---|---|---|---|---|
| | 0.450 | 0.350 | 0.200 | 1.000 |
| | 20 | 20 | 25 | 10 |

Decision
Strength of Ink:
Minimum Diff. in Same Sep (%): 25
Max Common Darkness: 20

Direction
Max Diff For Split Frame:

Color
Frame Color Reduction: | 0.500 | 0.500 | 0.300 | 0.500 |
                      | 55    | 57    | 60    | 10    |

Transparent
Values of Trans Sep (%):

Full Black
Starting Value For Black (%): 85

Full Yellow
Starting Value For Yellow (%): 90
Min C+M+K Darkness: 50

Defaults

- Frame
- Don't Frame
- Special Colors
- White Frame
- Base/Varnish

FIG. 6L

SYSTEM AND METHOD FOR ARTWORK DESIGN AND PRODUCTION

FIELD OF THE INVENTION

The present invention relates to computerized preparation of artwork generally.

BACKGROUND OF THE INVENTION

Artwork typically comprises many elements, often taken from many original sources. FIG. 1 provides an exemplary, very simple, page of artwork to be produced. It comprises an image area 10 and a text area 12. Image area 10 includes an image of a person covered by the letter T surrounded by a neon effect 16 and text area 12 contains lines of words. A neon effect is a gradual changing of color surrounding an object within an image.

Artwork typically also contains graphical elements where the term "graphical" refers to elements which can be described as vectors or collections of vectors.

The artwork of FIG. 1 can be pre-press artwork, such as an advertisement or illustration, to be printed on a poster, in a magazine or newspaper, etc., or it can become part of a multi-media presentation. A pre-press example will be provided hereinbelow and utilized throughout the present application.

FIGS. 2A and 2B illustrate the prior art process or "workflow" by which the simple artwork of FIG. 1 is produced and indicate the output of most of the pre-press operations. Operations which are interactive are so noted by double boxes. FIG. 2A illustrates the basic workflow; FIG. 2B illustrates one possible correction process.

An artwork designer first plans the page of artwork. To do so, he selects the elements, such as a photograph of the person 20 with a cloud 22 in the background, the lines of text and a large font T, to be placed on the page.

Then, he instructs a production house to scan (step 30) and color correct (step 32) the photograph thereby to create a digital image 24. The scanning and color correction steps are typically performed on a scanner, such as the SMARTWO manufactured by Scitex Corporation Ltd. of Herzlia, Israel.

Finally, the designer instructs the production house to mask out (step 34) everything but the person 20. This can be performed manually or with an interactive software package such as the MASKCUTTER package, also manufactured by Scitex Corporation Ltd. The result is masked image 26.

The artwork designer also prepares, in step 36, a "layout" 21 which is a blank page of a desired size. In step 38 the designer defines the areas where the artwork elements are to be placed and their shapes. The artwork of FIG. 1 has two rectangular areas, one for each artwork element.

In step 40, the artwork designer assigns the masked image of person 20 to the left rectangle of the layout 21. The masked image is cropped to fit the rectangle.

In step 42, the artwork designer interactively creates the text portions of the page of artwork. He places a large font letter T in the left rectangle of the page, on top of the image of the person. He also creates lines of text, in a small font, which he places in the right rectangle of the layout 21.

Steps 36–42 are typically performed interactively with a single layout application package, such as PAGEMAKER manufactured by Aldus Corporation of Seattle, Wash., USA or QUARKEXPRESS manufactured by Quark Inc. of Denver, Colo., USA.

A neon effect is an operation performed on a raster image. In this case, the neon effect will affect those pixels of the image of the person near the boundaries of the letter T. Prior to producing the neon effect, its location has to be defined. Therefore, in step 44, the artwork designer uses an illustration application package, such as ILLUSTRATOR, manufactured by Adobe Systems Inc. of Mountain View, Calif., USA, to convert the large letter T from a text representation to a vector representation, and to indicate its location.

In step 46, the artwork designer interactively creates a neon effect of a desired thickness around the now defined boundaries of the letter T, typically using a painting program, such as PHOTOSHOP, manufactured by Adobe Systems Inc. To do so, the designer "paints" a neon effect around the letter T. The painting program then changes the values of those pixels of the image of the person which are within the desired distance from the boundaries of the vector representation of the letter T to the graduated values of the neon effect.

After finishing the neon effect, the design work is finished and the artwork needs to be produced. The designer then provides the work to the production shop.

In step 48, the entire artwork is converted from graphical, textual and image (rasterized) elements to a raster representation. The conversion is typically performed by a raster image processor (RIP) such as the VIP RIPper manufactured by Scitex Corporation Ltd. and running on a MACINTOSH computer manufactured by Apple Computer Company of Cupertino, Calif., USA.

Prior to plotting, the page is "trapped", meaning that it is framed. For example, the Full Auto Frame (FAF) trapper, manufactured by Scitex Corporation Ltd., can perform this step.

At this point, the artwork can be proofed, if it is desired to check the output prior to committing it to film. A suitable proofing system is the APPROVAL proofing system jointly produced by Scitex Corporation Ltd. and Eastman Kodak Company of Rochester, N.Y., USA. Otherwise, the artwork is plotted (step 52) onto a film. Any laser plotter, such as the DOLEV, manufactured by Scitex Corporation Ltd., can perform this step.

As can be seen, the preparation of a single page of artwork is performed by many people and requires many steps or "pre-press operations" and many different kinds of devices and/or application packages. A production shop typically performs many jobs at one time, each with many operations to perform and each following its own workflow. Such a shop can be very difficult to manage.

The SCITEX MANAGER, manufactured by Scitex Corporation Ltd., provides a production shop with tools to manage the many digital files which accumulate and to determine their status at any time.

Israel Patent Application 106226, owned by the common owners of the present invention, describes a pre-press management system which enables the artwork designer to describe the workflow and operations which the production shop is to perform for a specific job. This information is stored in the system and is provided to the production shop workers as they perform the operations of the job.

The system of Israel Patent Application 106226 can be utilized to determine the status of a job and the amount of work each production area of the shop has.

Once the production shop finishes a job, it provides the results to the artwork designer. These can be digital files, proofs or plots.

If the results are proofs, the artwork designer will review them to determine if the result is acceptable. If it is, the designer will then ask that the production shop produce final films. However, it is very possible that the artwork designer will not be pleased with the first proof, either because he doesn't like the design or because he doesn't like its execution. In either case, corrections need to be made and this requires that at least some of the steps in the workflow shown in FIG. 2A have to be repeated. In particular, the steps which occur downstream of the correction step generally have to be repeated.

For example, the designer may decide that T is the wrong letter; he would prefer a Y. Alternatively, he may decide that he prefers a different font or that he wants to move the T to a different location. These changes are editing changes; the workflow to produce the job has not changed but the elements flowing through the workflow have.

Unfortunately, since the neon effect is produced by one application in response to the specific look of the original letter T while the letter T is defined and placed in the correct location within the layout in another application, changing the letter T will not cause a change in the neon effect. Therefore, to make the correction, the designer first has to edit the text, in step 54 and then he has to repeat the operations of steps 42–52 (herein labeled 44'–52') but on the new piece of text (the letter Y in FIG. 2B). This is a time-consuming process which requires a significant amount of user intervention.

Furthermore, it is noted that the pre-press operations occur on many different devices (the term "device" will be utilized herein to denote both a device and an application package). The output of one device is provided to another via digital files. Since each device represents the artwork in its own native file format, this transferring of files requires that each device know how to convert between formats.

There exists an output page description language called POSTSCRIPT, developed by Adobe Systems Inc., which describes the contents of a page of textual and/or graphical elements. POSTSCRIPT can also handle raster images, but only for placement; it cannot describe their contents. Many of the devices described hereinabove are capable of representing their output with POSTSCRIPT. Thus, POSTSCRIPT provides a method of communication between different applications.

Ideally, if a correction to a page of artwork has to be made, one could edit the relevant file, rather than reperforming the operations which produced the file. However, POSTSCRIPT files are not easily edited.

Some new application packages have recently been announced which attempt to provide editability to the pre-press process. Most of them define image manipulation as manipulation of a multiplicity of objects (i.e. images). In these packages, the objects can be edited as desired; when editing is finished, the desired manipulation is performed on the original input image. Some of these packages are COMPOSER by Altamira Software Corporation of Mill Valley, Calif., USA, PAINTER/X2 manufactured by Fractal Design Corporation of Aptos, Calif., USA, IMAGEWIZARD manufactured by ImageWare Software Inc. of San Diego, Calif., USA, PICTURE PUBLISHER manufactured by Micrografx Inc. of Richardson, Tex., USA and COLLAGE manufactured by Specular International of Amherst, Mass., USA.

While these packages provide a flexible and editable environment for specific pre-press operations, they do not provide such an environment for the entire pre-press process, from input creation and image manipulation through to output.

There exists a single application, ECLIPSE manufactured by Alias Research Inc. of Anaheim, Calif., USA, which combines image creation and manipulation with stripping operations. While this provides a single environment for artwork creation, it requires that users give up their old applications and learn to operate the new one, ECLIPSE. Furthermore, the user is restricted to the operations provided by ECLIPSE.

There exists an image description language called FITS, developed by FITS Imaging of Paris, France, which describes only raster images and the operations performed thereon.

Adobe Systems Inc. has recently announced a new page description language, called the Portable Document Format (PDF), which preserves the essential look and feel of a document. PDF is output device and platform independent and can therefore be used to share documents between users working on different platforms, such as a PC or MACINTOSH computer, without losing the essential features of the document.

From announcements of the SCRIPTX language of Kaleida Labs Inc. of Beverly Hills, Calif., USA, it would appear to provide a similar device and platform independence for multi-media output.

None of the above described application packages offer the capability to implement changes in one element of an artwork when other parts of the artwork depend on the look of the changed element, especially when the other parts of the artwork are a different type of element, such as text vs. images. For example, changing the letter T to a letter Y is a textual change while the neon effect is implemented on a raster image. Thus, none of the above described application packages can change the neon effect when the letter T is changed to a Y.

Apple Computer Corporation has defined a standard, APPLE EVENTS, for applications written in two parts, a user interface front end and a core back end. Once a user has selected an operation to be performed, the user interface front end sends a command, in the APPLE EVENTS format, to the back end. The back end then performs the operation.

Apple Computer Corporation has also produced an APPLE SCRIPTS application package which can capture the APPLE EVENTS commands of one or more application. The APPLE SCRIPTS application can then rerun the entire set of recorded APPLE EVENTS by using the resultant script as input to the appropriate back ends.

SUMMARY OF THE PRESENT INVENTION

It is therefore an object of the present invention to provide a system and method for artwork design and production operative in conjunction with a plurality of artwork manipulation devices. The system includes an artwork preparation administrator which organizes and implements a process or workflow to produce a job. A job can be a single page, many pages, a multi-media display, a magazine, an advertisement, etc.

In accordance with a preferred embodiment of the present invention, the artwork preparation administrator includes a workflow definition unit, through which the designer, and occasionally also the production shop workers, define the workflow, and a workflow manager with which the process is implemented. The workflow is a listing of the operations needed to produce the job and their flow.

If the artwork designer produces the job in conjunction with a production shop, the artwork designer can utilize the workflow thus defined to describe to the production shop which operations the shop is to perform, thereby providing the production shop with a context within which to work.

Each artwork manipulation device is capable of providing task information formed of both the operations, or commands, performed when the device is activated and the parameters of the performed operations. In accordance with a preferred embodiment of the present invention, the workflow manager includes apparatus for receiving and processing the task information from those artwork manipulation devices which are selected.

Additionally, in accordance with a preferred embodiment of the present invention, the artwork preparation administrator also includes a workflow database. The apparatus for receiving preferably stores the processed task information in a block of the workflow corresponding to the currently active artwork manipulation device.

Moreover, in accordance with a preferred embodiment of the present invention, the apparatus for receiving task information includes apparatus for filtering the task information to ensure minimal redundancy of operations.

As the artwork designer and production shop workers perform operations of the workflow, the workflow is updated with the new commands and/or parameters. When the workflow is completed, it lists all of the operations and commands needed to perform the job.

In accordance with a preferred embodiment of the present invention, the workflow manager additionally includes apparatus for producing a "process list" listing the operations to be reperformed by at least selected ones of the artwork preparation devices. The process list is ordered in accordance with the portion of the workflow corresponding to the selected artwork preparation devices.

In accordance with a preferred embodiment of the present invention, the artwork preparation administrator further includes an interpreter which executes the commands of the process list on high resolution artwork elements and rasterizes the result for output to an output device, such as a plotter or proofer.

Additionally, in accordance with a preferred embodiment of the present invention, the artwork preparation administrator includes a previewer which performs the operations listed in the process list on low resolution artwork elements and displays the result on at least a portion of a screen of a monitor. Alternatively, the previewer can operate on high resolution elements displayed in a small window of the monitor. If the designer makes a correction, say of the letter T to the letter Y, the previewer displays to him the output of the workflow which results from the change.

To this end, in accordance with a preferred embodiment of the present invention, the apparatus for receiving also includes apparatus for editing the task information in accordance with editing operations of a user.

It will be appreciated that the present invention provides editability of generally the entire artwork preparation process. If a modification must be made, only the modification itself need be performed (e.g. the T is changed to Y and no other operations are performed). The operations, such as the neon effect, which depend on the result of the modification are automatically reperformed (by the previewer and/or the interpreter) since they are listed in the process list.

Finally, in accordance with a preferred embodiment of the present invention, the method of the present invention includes the steps of: a) defining a workflow comprised of a multiplicity of artwork preparation tasks, b) for each artwork preparation task, processing and storing task information regarding the task and c) producing a process list comprising processed task information from at least one of the artwork preparation tasks and ordered in accordance with a portion of the workflow having the at least one artwork preparation task therein.

BRIEF DESCRIPTION OF THE DRAWINGS AND APPENDIX

The present invention will be understood and appreciated more fully from the following detailed description taken in conjunction with the drawings and appendix in which.

Appendix A is an exemplary process list for the tasks of the exemplary pre-press process of FIG. 2 and FIGS. 6A, 6B, 6C, 6D, 6E, 6F, 6G, 6H, 6I, 6J, 6K, 6L, 6M and 6N are screens from application packages showing the parameters of an artwork preparation task for the tasks listed in the process list of Appendix A.

DETAILED DESCRIPTION OF A PREFERRED EMBODIMENT

Figure 1:
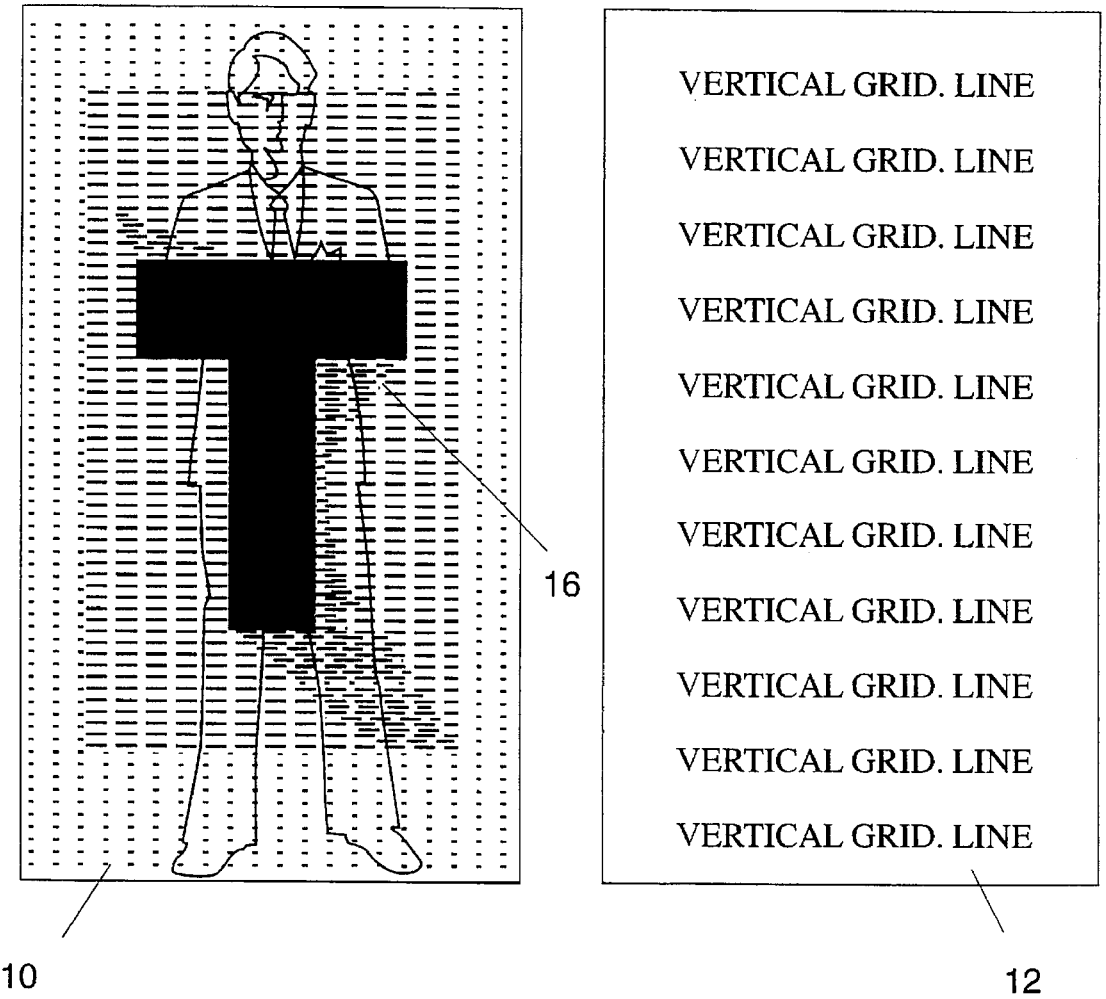
FIG. 1 is an illustration of a page of artwork to be printed.
Figure 2A:
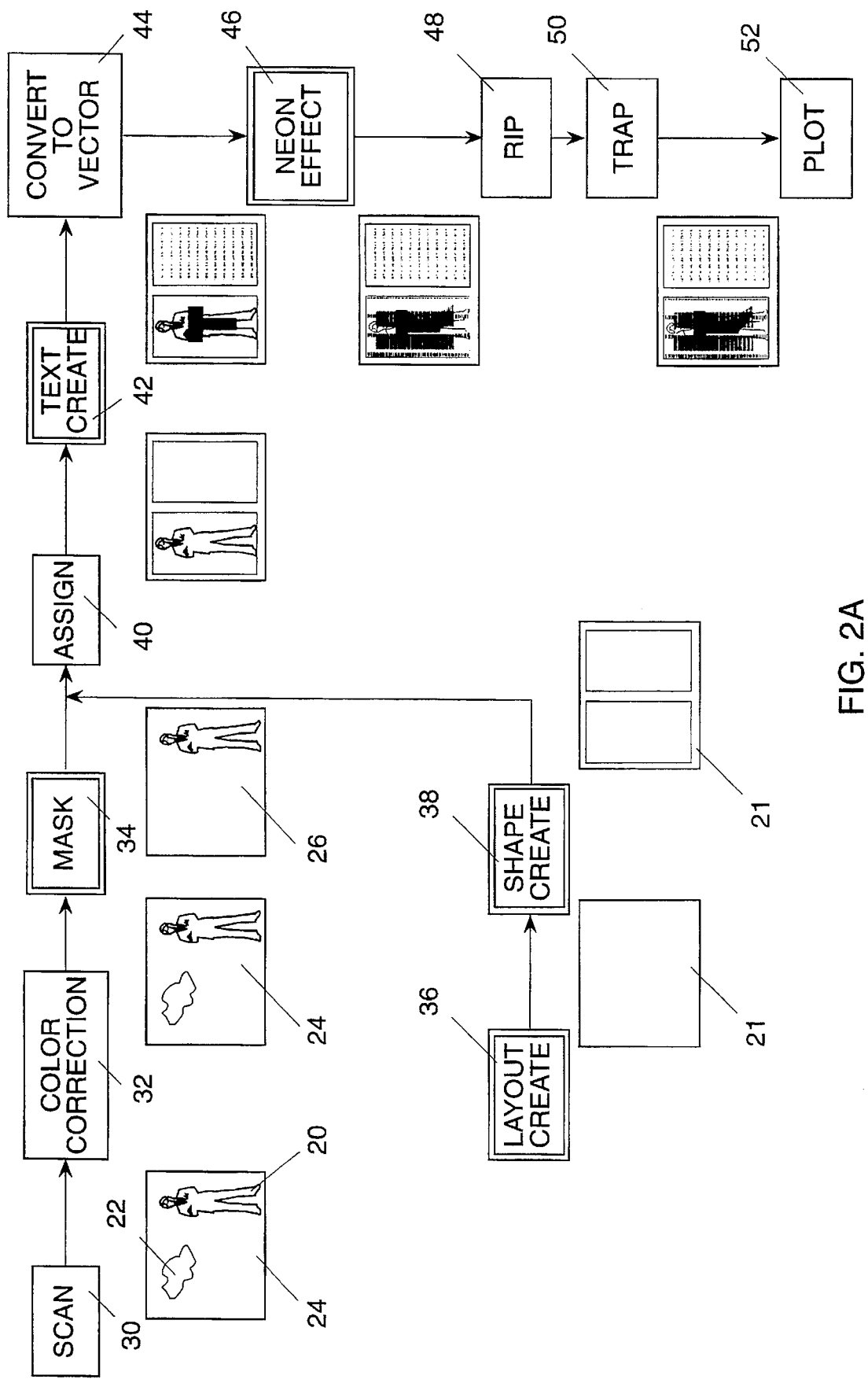
FIG. 2A is a block diagram illustration of the prior art pre-press process for producing the artwork of FIG. 1.
Figure 2B:
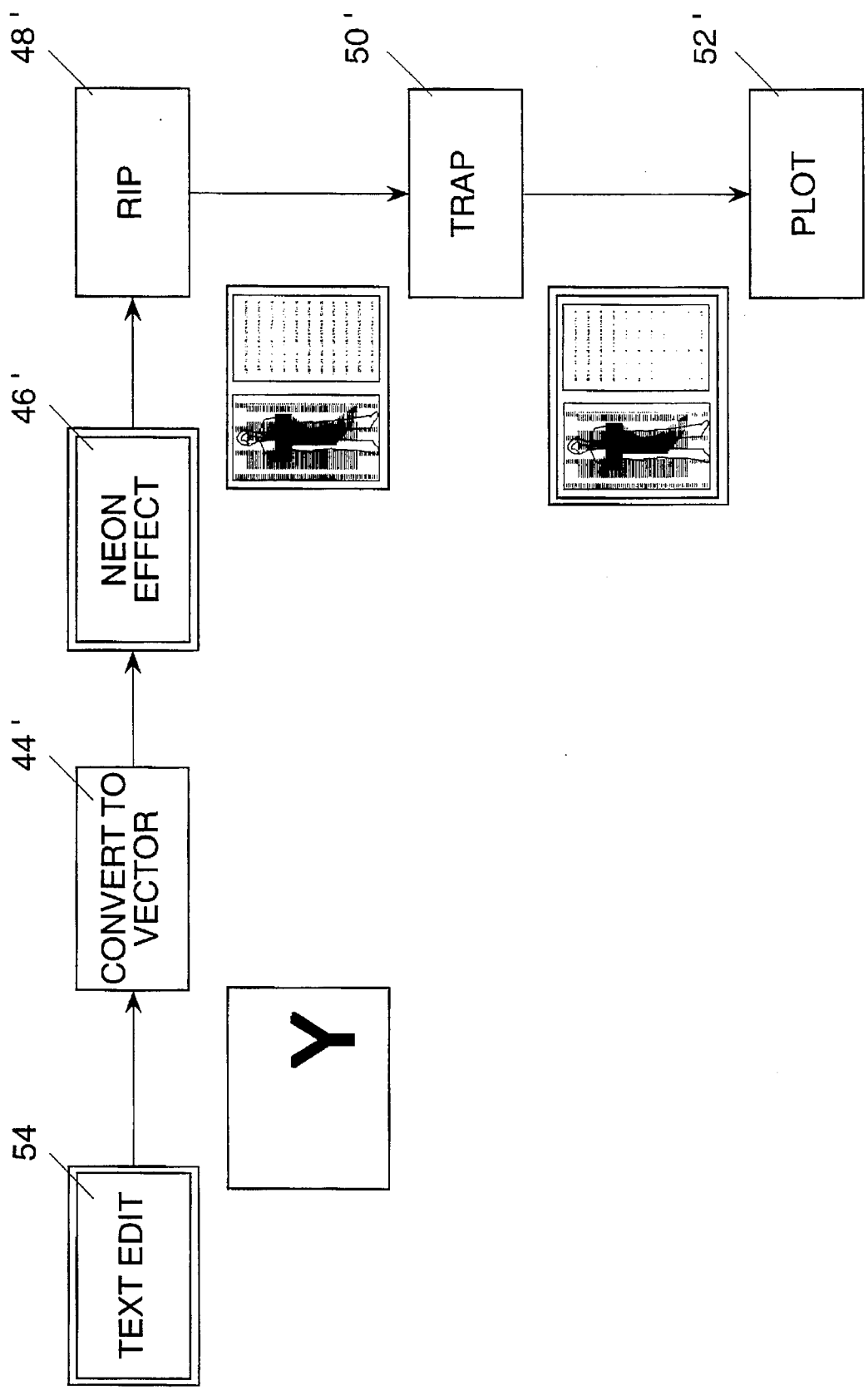
FIG. 2B is a block diagram illustration of a correction process utilizing a portion of the process of FIG. 2A.
Figure 3:
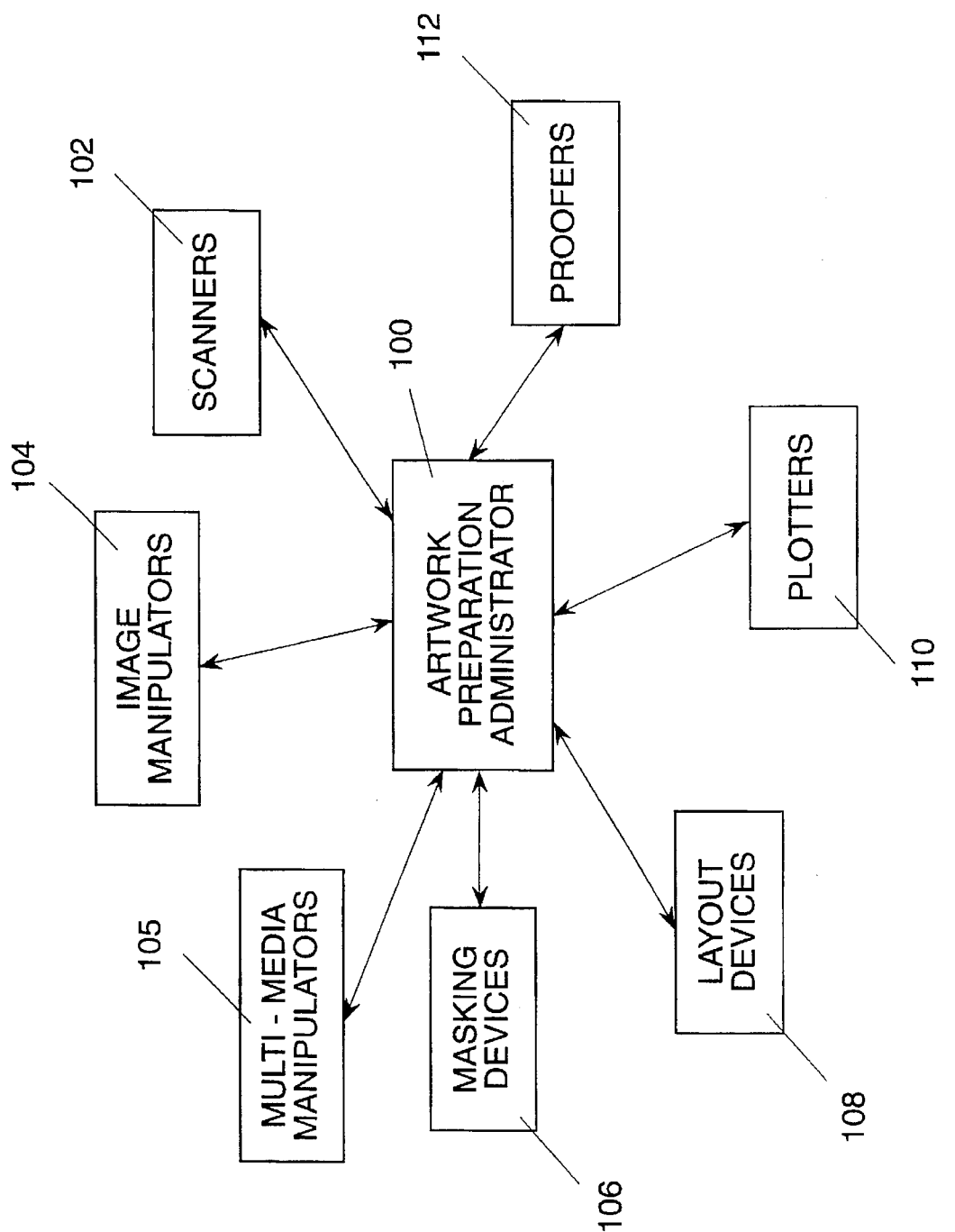
FIG. 3 is a block diagram illustration of a pre-press system constructed and operative in accordance with a preferred embodiment of the present invention.
Figure 4:
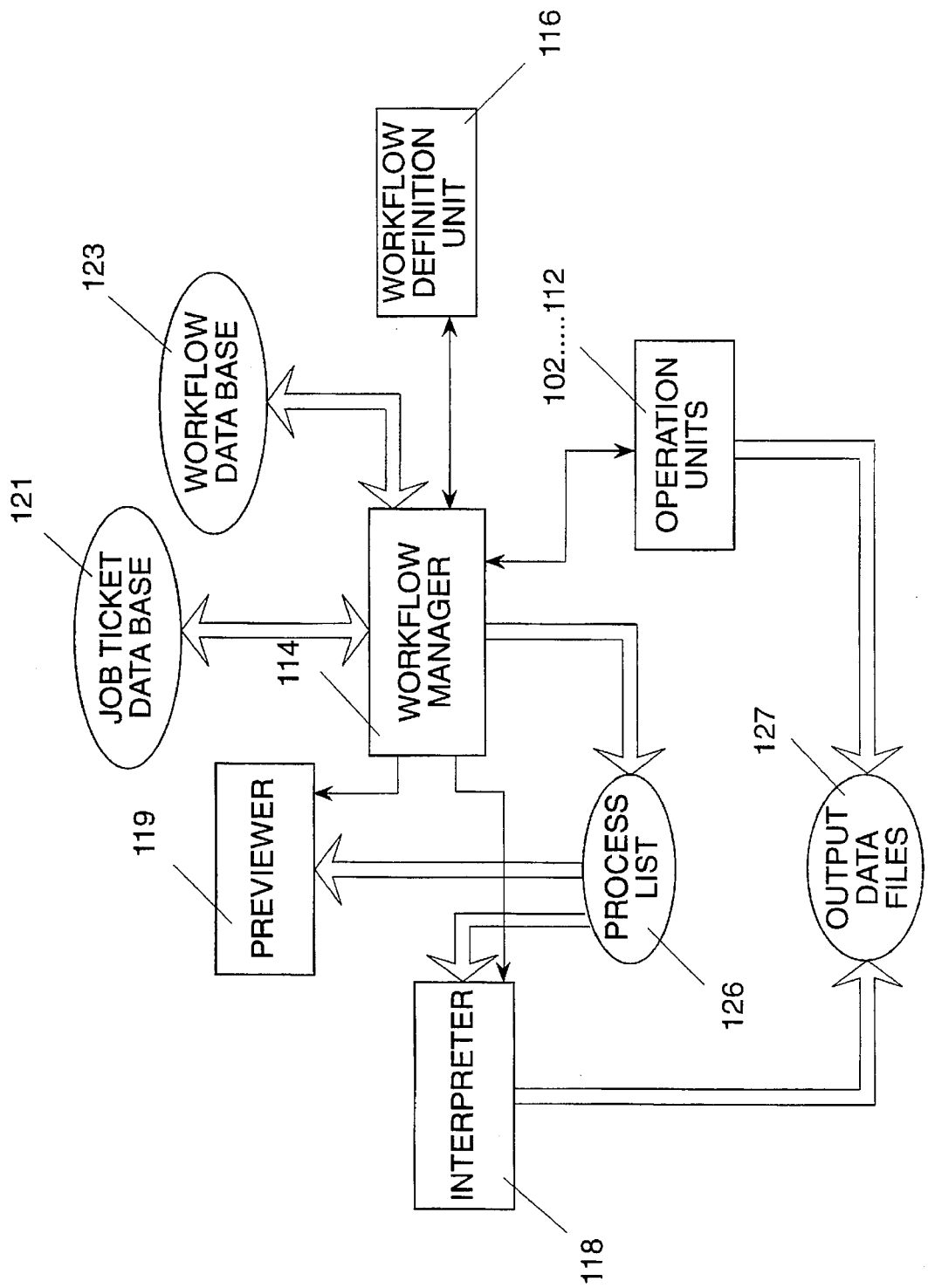
FIG. 4 is a block diagram illustration of elements of a pre-press administrator forming part of the pre-press system of FIG. 3.
Figure 5:
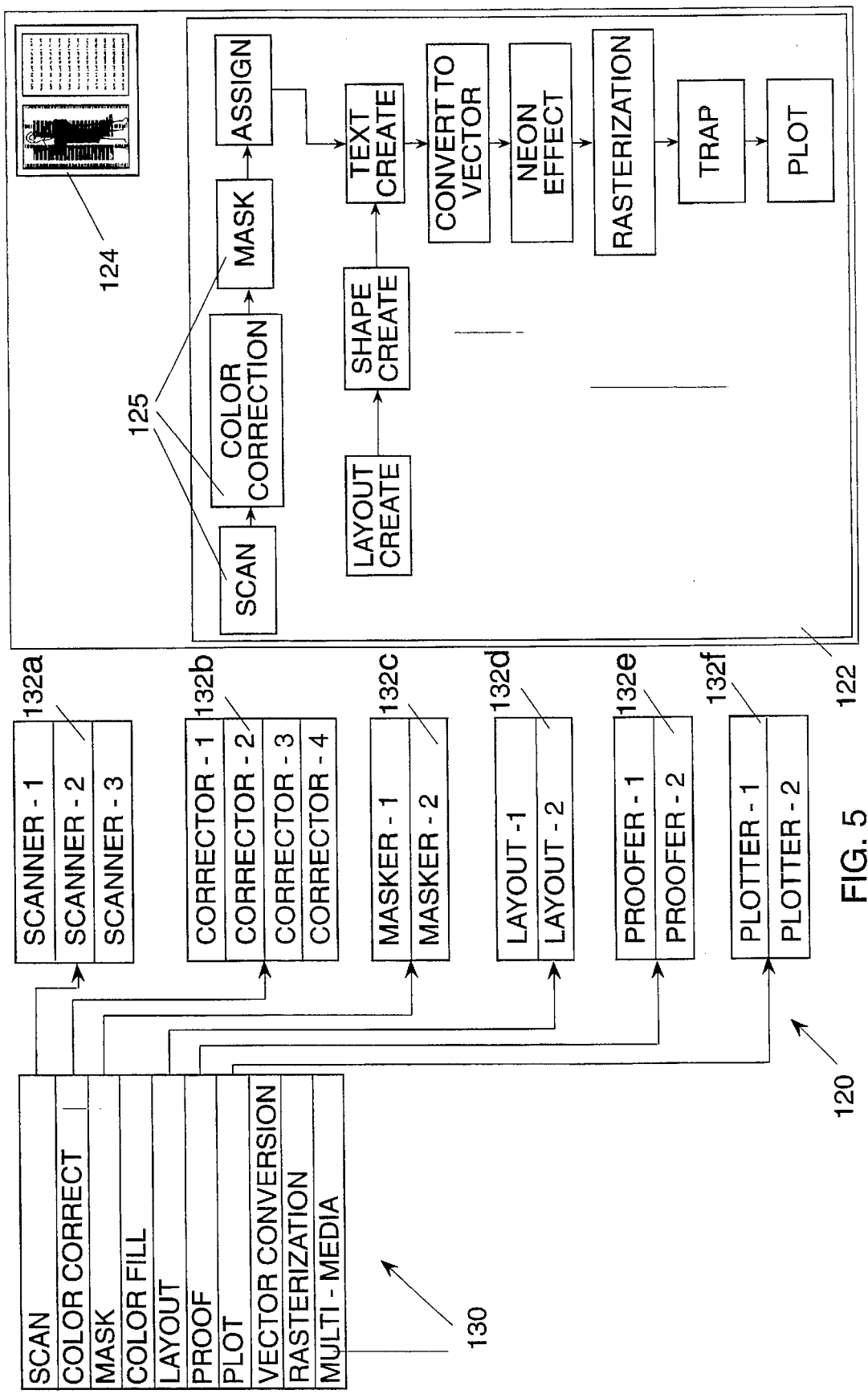
FIG. 5 is a schematic illustration of a main display of the pre-press system of FIG. 3.
Figure 6B:
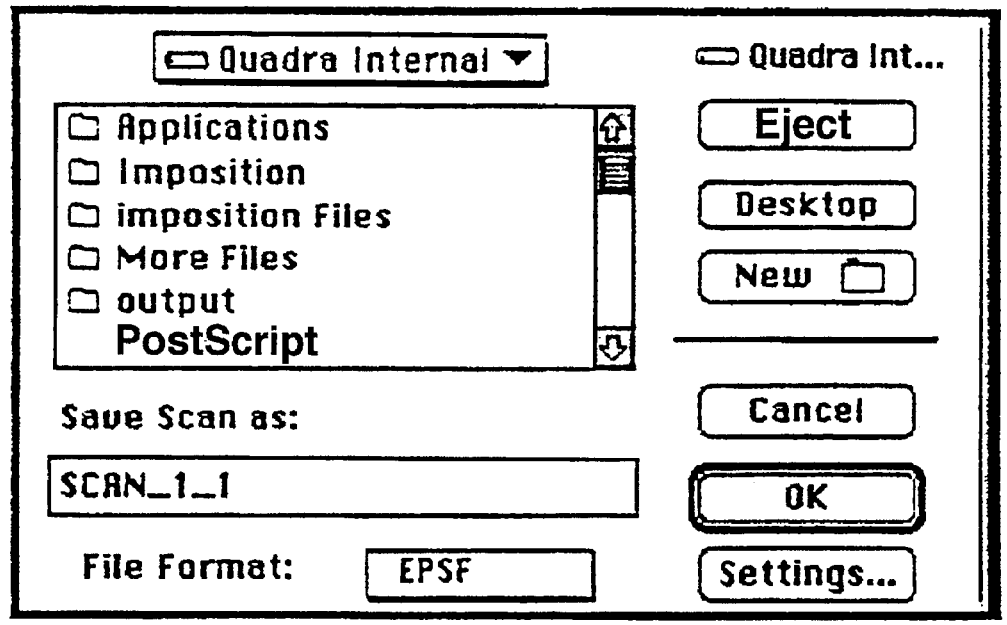
Figure 6C:
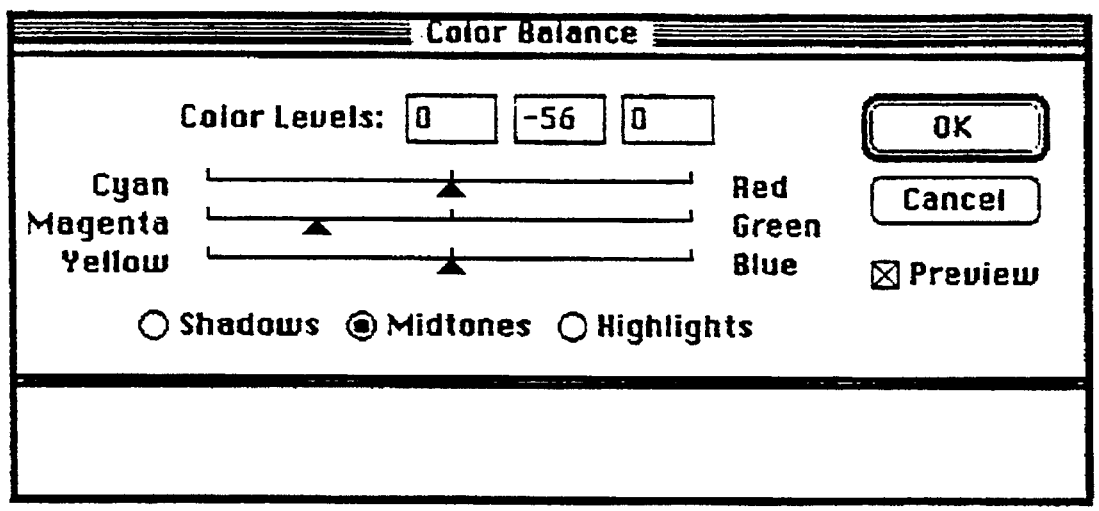
Figure 6D:
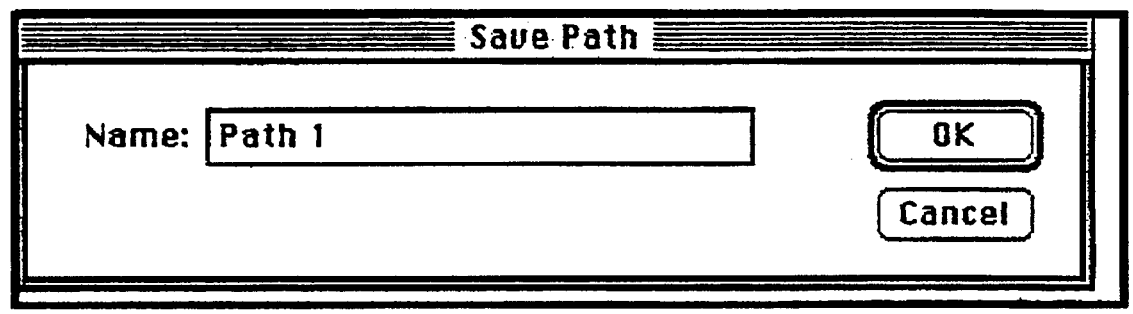
Figure 6E:
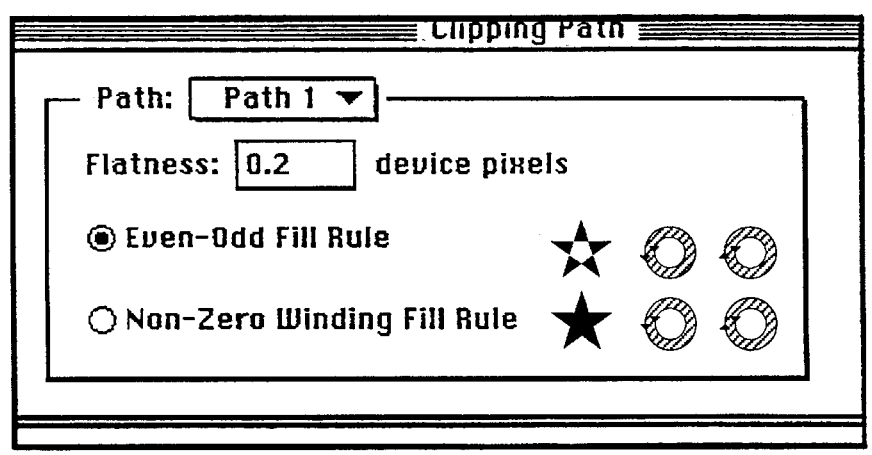
Figure 6F:
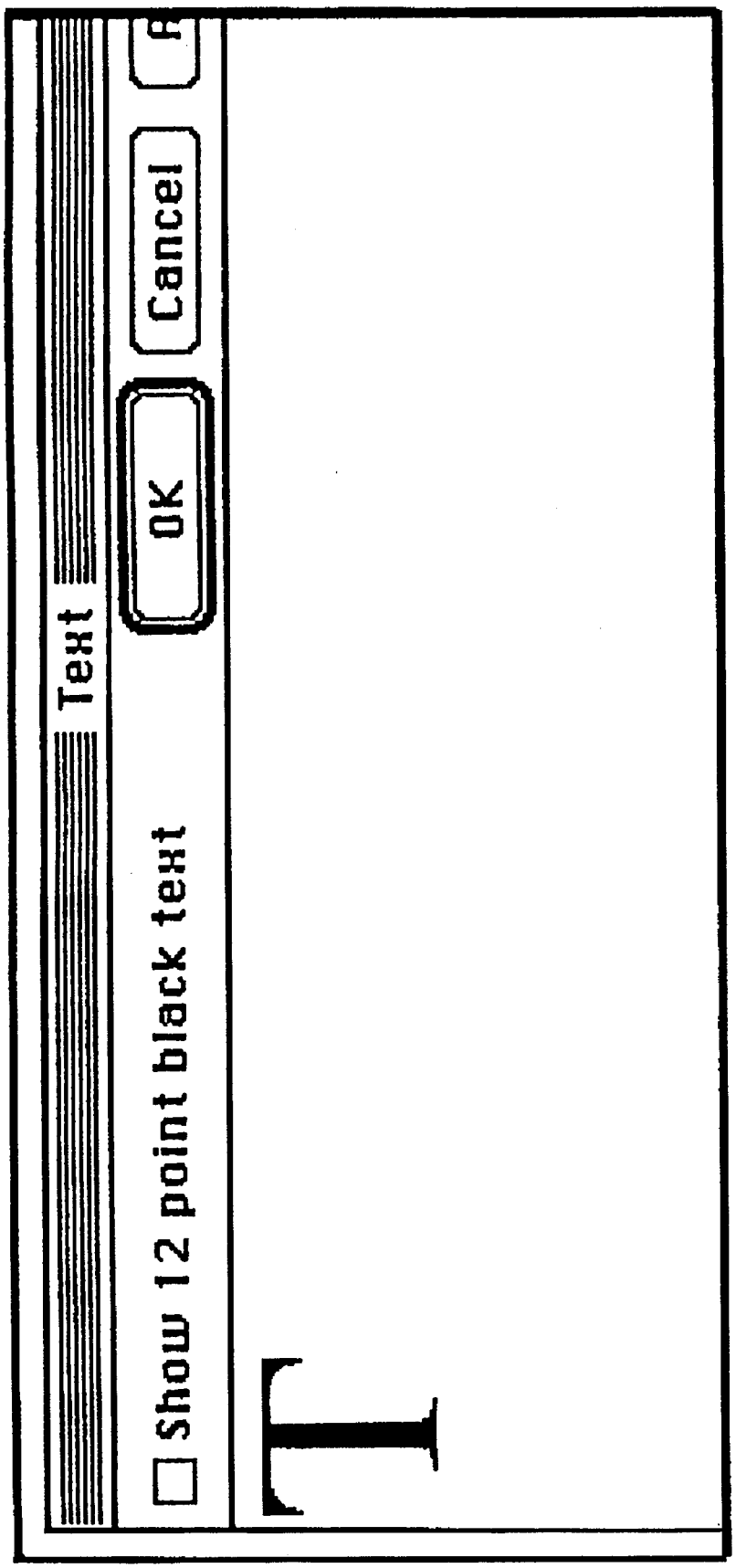
Figure 6G:
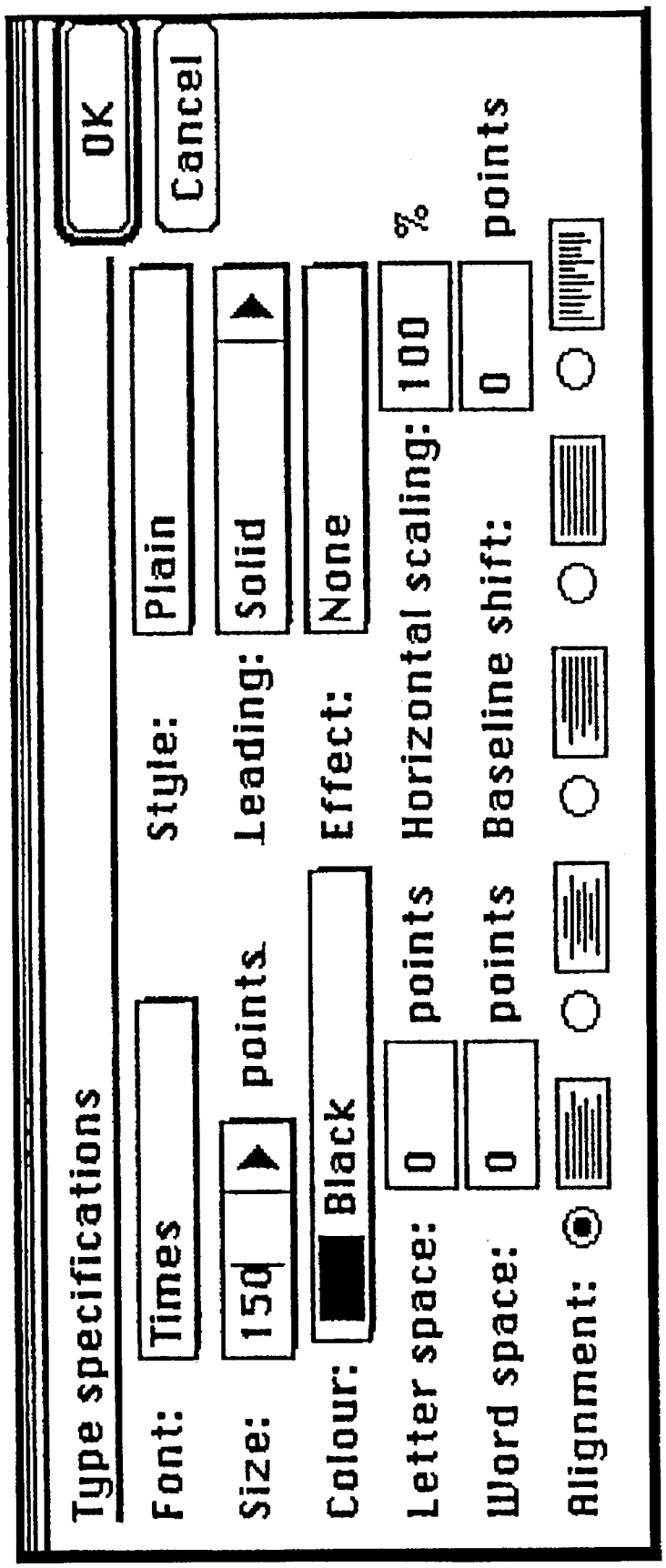
Figure 6H:
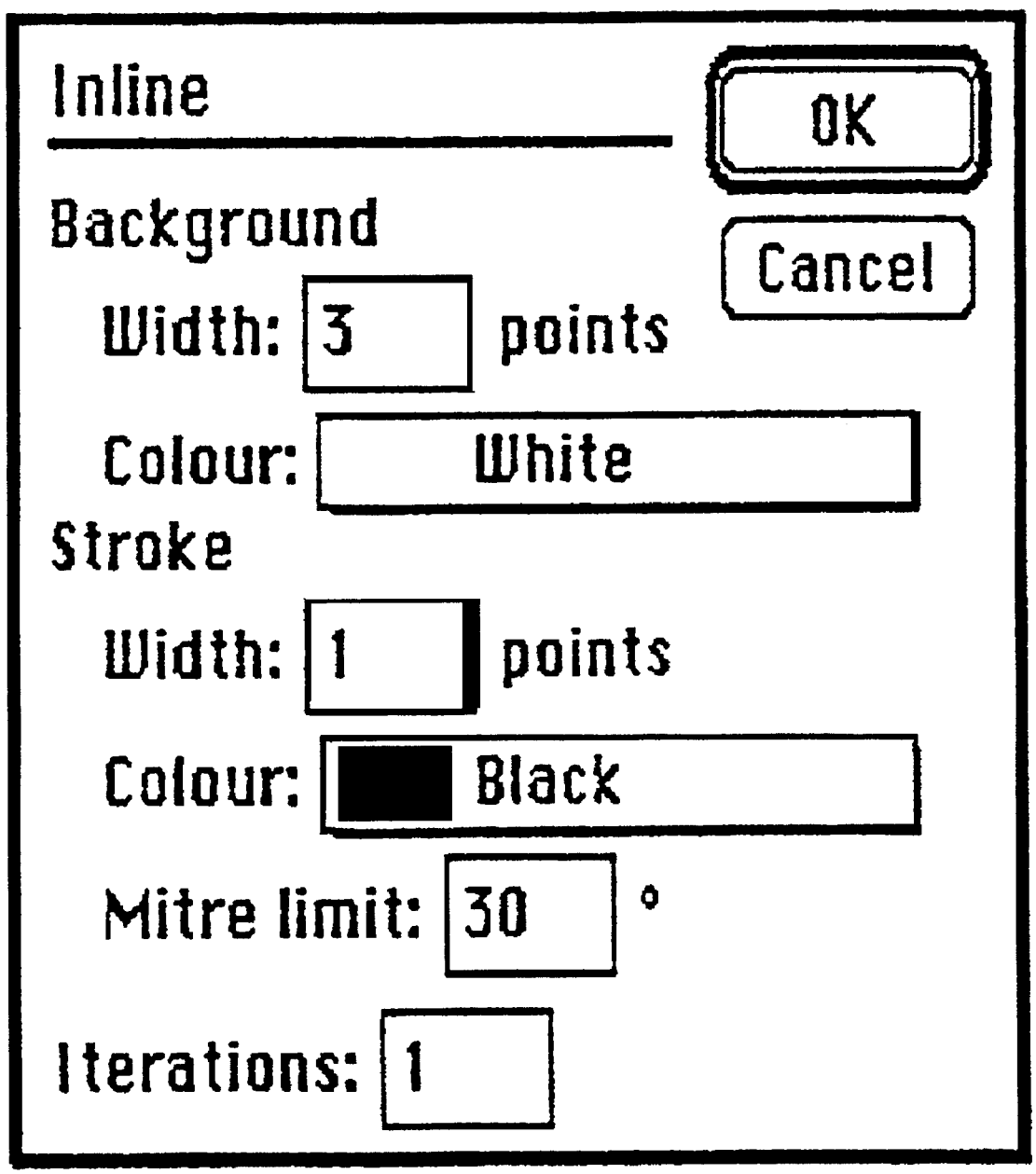
Figure 6I:
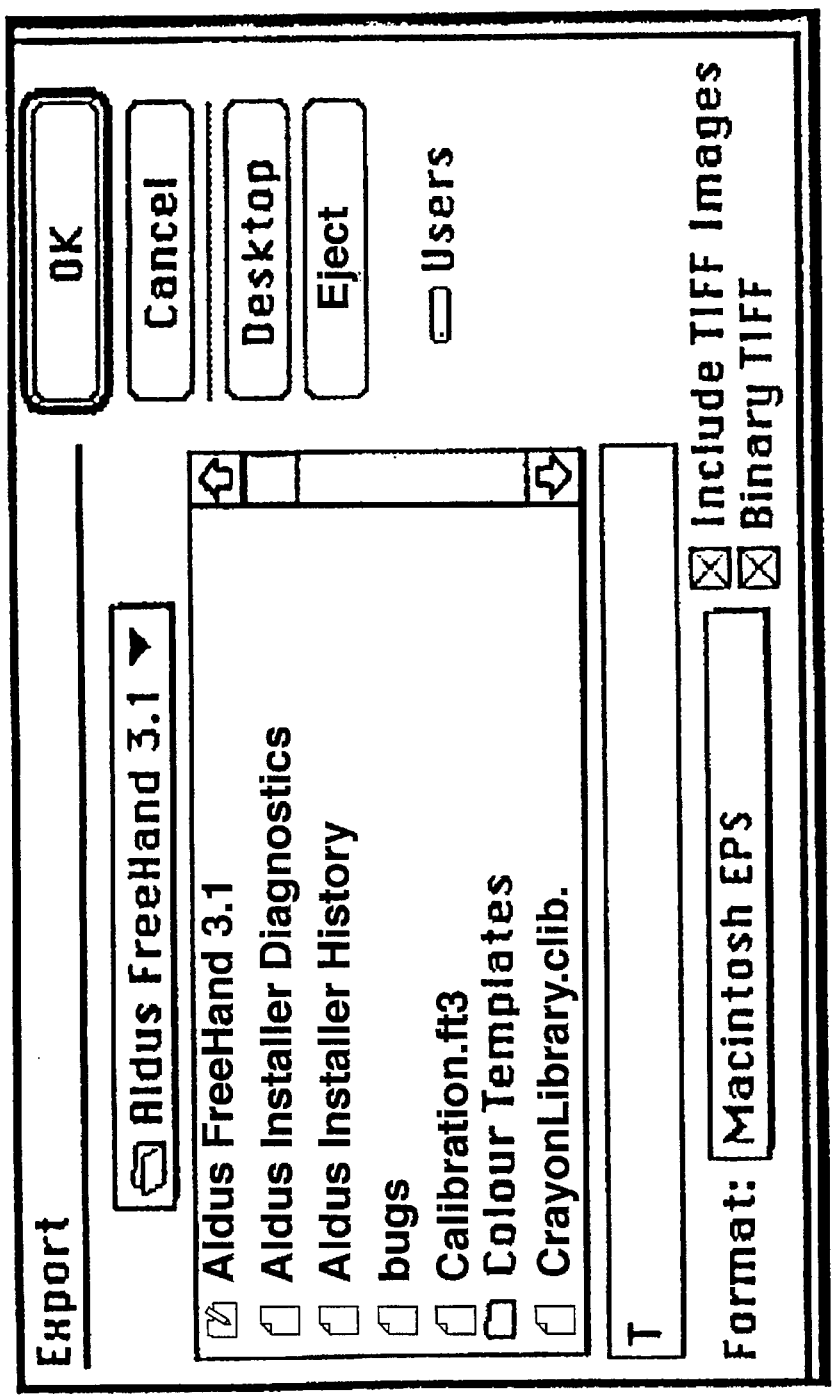
Figure 6J:
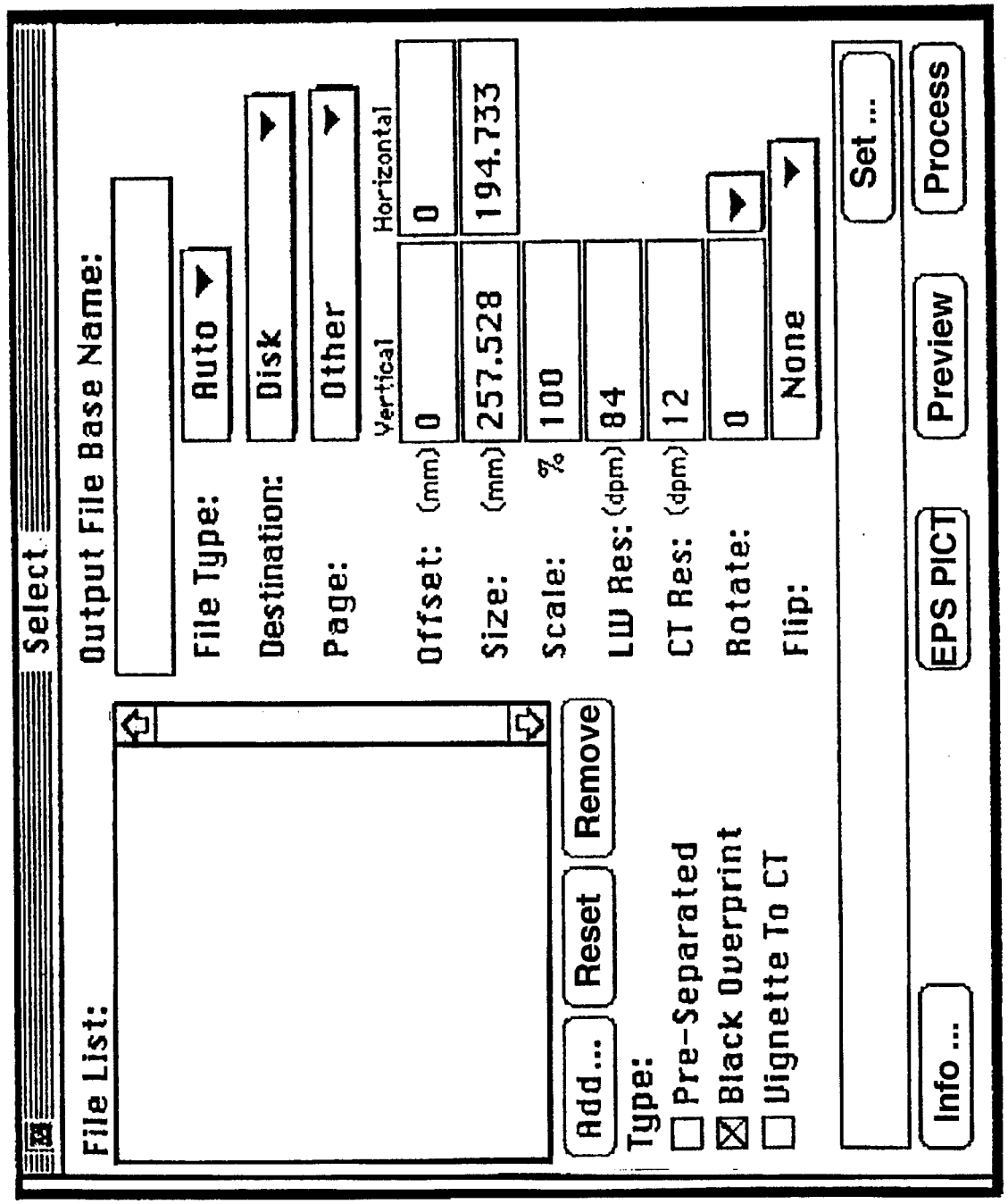
Figure 6K:
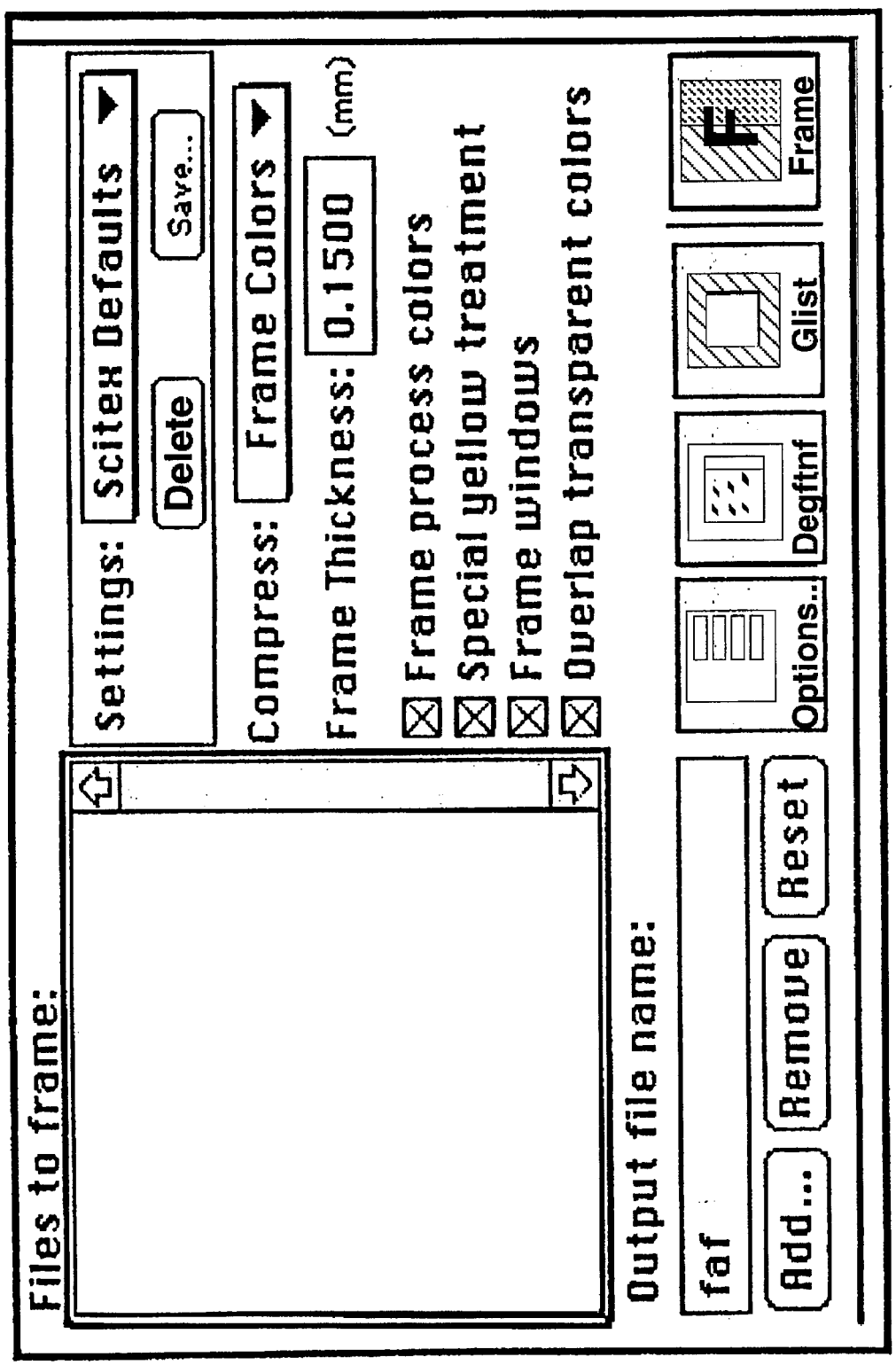
Figure 6M:
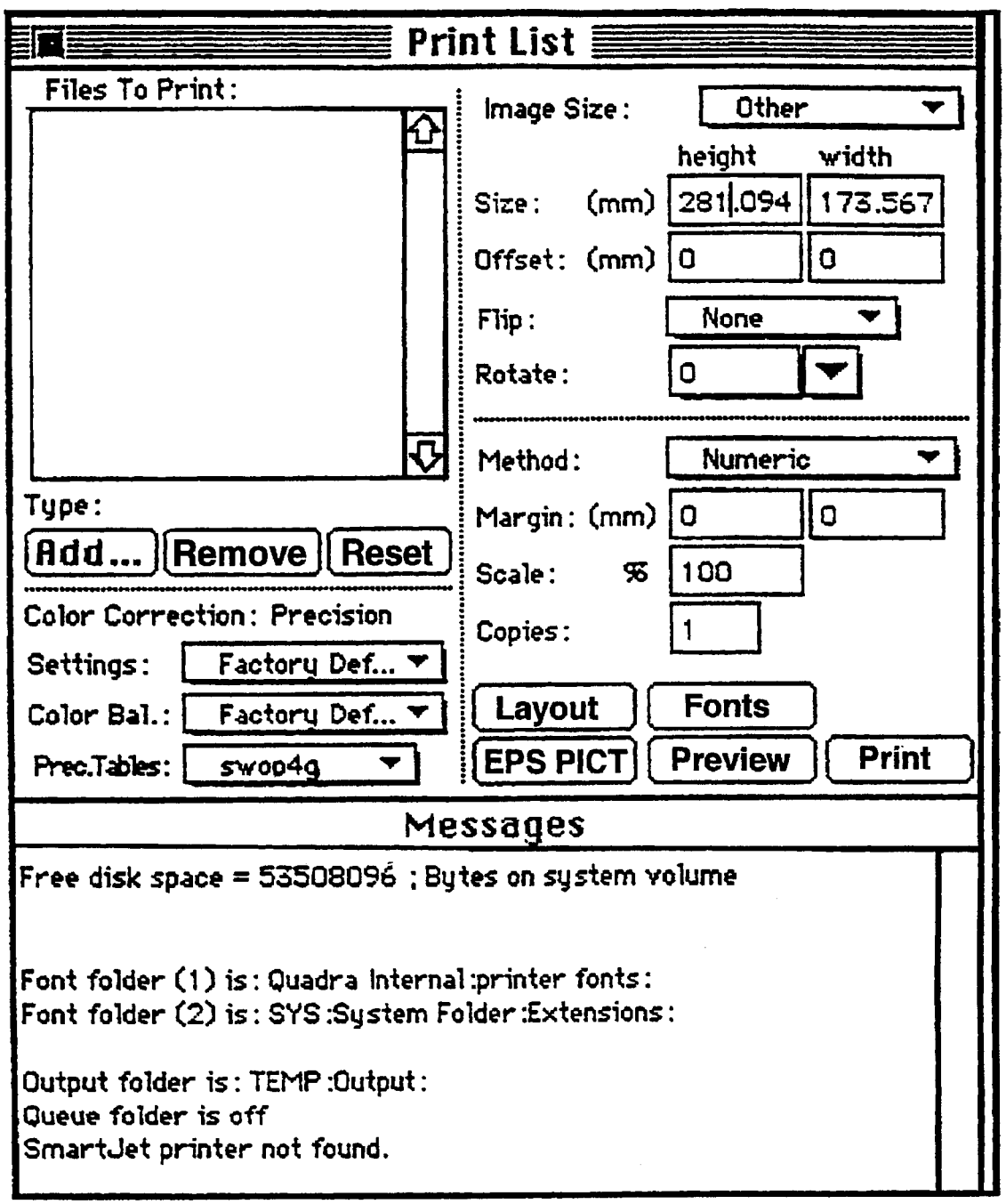
Figure 6N:
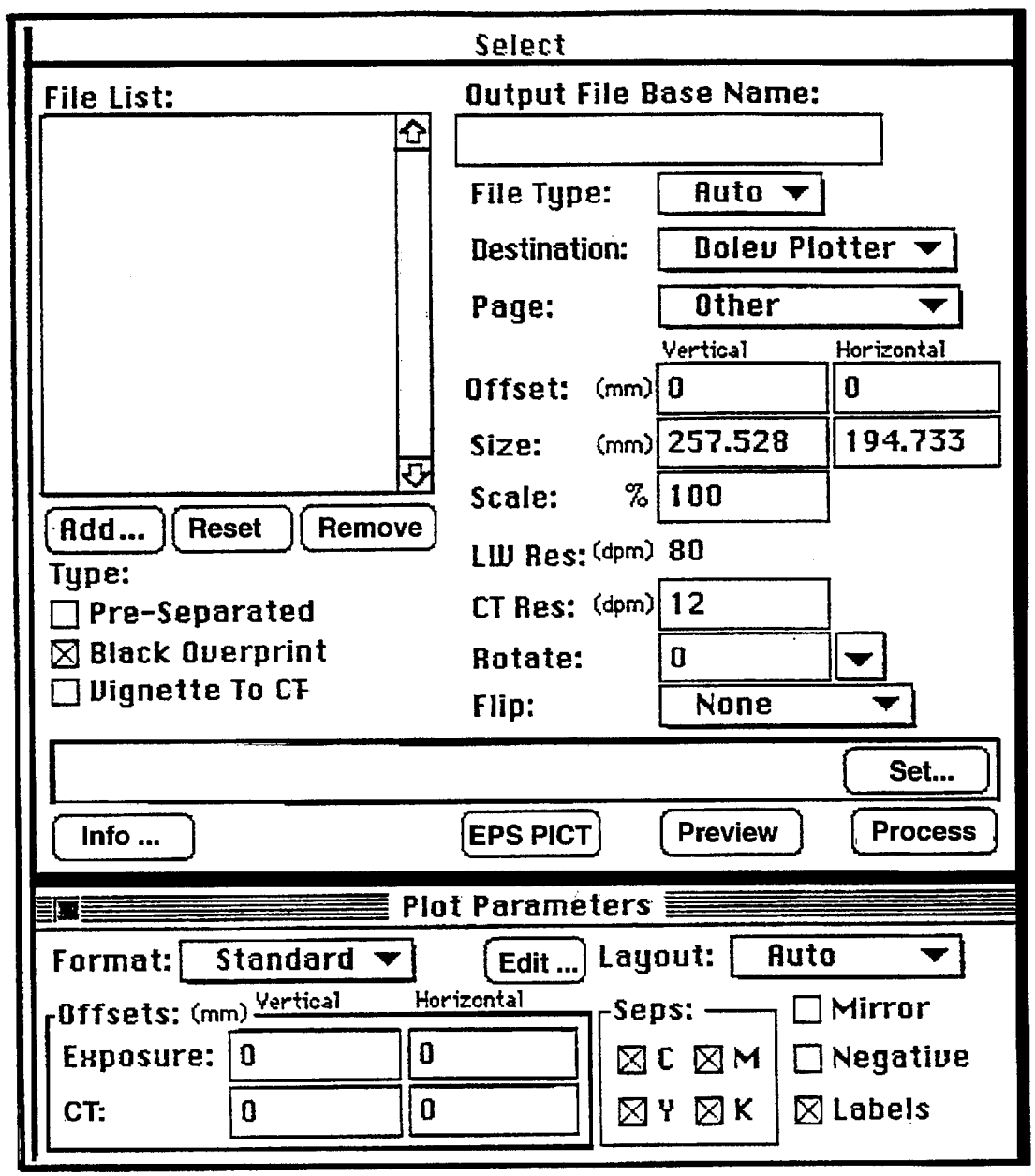

Reference is now made to FIG. 3 which illustrates an artwork design and production system, constructed and operative in accordance with a preferred embodiment of the present invention. Reference is also made to FIGS. 4–6 which are useful in understanding the operation of the system of FIG. 3. The artwork design and production system of the present invention will be described in the context of preparing, correcting and producing the pre-press artwork of FIG. 1 as described hereinabove with reference to FIGS. 2A and 2B. It will be appreciated that this is by way of example only.

The artwork design and production system comprises an artwork preparation administrator 100 and a plurality of artwork preparation operation units 102–112, each performing one or more different artwork preparation operations, such as scanning, color correcting, layout, plotting, etc. The operation units shown in FIG. 3 are scanners 102, image manipulators 104, multimedia manipulators 105, maskers 106, layout devices 108, plotters 110 and proofers 112. The artwork preparation administrator 100 can work with many devices which perform the same type of artwork preparation operation; for example, it might be connected to two scanners 102, two image manipulators 104 and one layout device 108.

The operation units 102–112 are typically modifications of commercially available units, modified to operate within the system of the present invention. They can be application packages running on general purpose hardware, such as the MACINTOSH computer, a PC manufactured by IBM of the USA or a computer manufactured by Sun Microsystems Inc. of the USA, physical machines, such as a scanner or plotter, or application packages running on special purpose hardware, such as a modified version of the CT application package manufactured by Scitex Corporation Ltd. and running on a WHISPER platform.

Typically, both a designer and a production shop have an artwork preparation administrator 100; however, each administrator 100 is typically connected to different types of machines, depending on the equipment the designer or production shop owns. Alternatively, if the designer and the production shop are connected together via a network, there is typically only one artwork preparation administrator 100 controlling the equipment found in both places.

The administrator 100 manages generally most of the artwork preparation process from defining the workflow to be followed for a given job through execution of the operations and corrections thereto. The administrator 100 manages the operations of the operation units 102–112, initiating them when selected by either the artwork designer or a production shop worker, and providing them with a database of shared data. Furthermore, the administrator 100 provides a preview of the final output of each particular job.

The administrator 100 typically also manages the multiplicity of jobs for which the artwork designer and/or production shop are responsible.

As illustrated in FIG. 4, the administrator 100 comprises a workflow manager 114, a workflow definition unit 116, an interpreter 118 and a previewer 119. Their operations will be described in more detail hereinbelow with reference to FIGS. 5 and 6. FIG. 5 illustrates a main screen display of administrator 100 comprised of three areas, an operation selection area 120 controlled by the workflow manager 114, a workflow window 122 controlled by workflow definition unit 116 and a selectable preview window 124 which is controlled by previewer 119.

Through the workflow manager 114, the artwork designer provides the "job ticket" information, such as the title or job number, the customer name and address, a deadline date, page size, number of pages in the job, etc. This information is stored in one record of a database 121.

With the workflow definition unit 116, the artwork designer then defines the desired workflow to be followed for the job. This initial workflow is a rough outline of the operations to be performed and typically does not include the specific parameters of each operation.

The workflow definition unit 116 provides the artwork designer with block diagram tools to select predetermined blocks, labeled 125, and to provide their connections, thereby producing the initial workflow. Shown in FIG. 5 is the workflow of FIG. 2A.

The workflow definition unit 116 provides the workflow to the workflow manager 114 which provides it and its blocks 125 with unique identifiers and stores the workflow in a workflow database 123. Each "record" of the workflow database 123 is organized to store the workflow itself and the task information regarding the performance of each of the blocks 125 of the workflow.

It will be appreciated that the workflow thus described is a very useful tool for communication between artwork designer and production shop. Because the workflow outlines the operations to be performed to finish the job, at a glance, both sides know what the artwork designer wants to do. Since the workflow is initially a rough outline of the job, if the artwork designer did not list an operation, the production shop can add it in later.

Through the workflow manager 114, the users (artwork designer and production shop workers) perform their respective operations listed in blocks 125 of the workflow. For this purpose, the workflow manager 114 acts as a shell package, providing the users with a selection of devices to operate and initiating operation of the selected device.

The selection is done via the selection area 120 which comprises a menu 130 of artwork preparation devices for the users to select, including a raster image processor (RIP) which forms part of interpreter 118. Upon selecting an operation, a secondary menu 132 appears, indicating the types of devices from which the users can select to perform the desired operation. Secondary menus 132a–132f are illustrated in FIG. 5.

For example, if a user selects to perform layout, secondary menu 132d is displayed listing the possible layout devices 108. From this menu, the user selects a desired layout application, where the two possibilities are shown, layout-1 and layout-2. These may be modified versions of the QUARKEXPRESS or PAGEMAKER layout application packages. Upon selection, the workflow manager 114 loads the selected package.

If the selected artwork preparation operation unit 102–112 is a physical machine, the workflow manager 114 indicates to the unit to begin operation. The user then operates the machine as necessary.

After selection and prior to the appearance of the secondary menu 132, the workflow manager 114 analyses the workflow and the selected device to determine if the input to the selected device is available. For example, the mask operation (step 34 of FIG. 2A) cannot be performed prior to the scanning operation (step 30) and the assignment operation (step 40) cannot be performed until the scan (step 30), layout create (step 36) and shape create (step 38) operations have been performed. If the selected device cannot yet be utilized, an appropriate warning is provided and the user is asked to select a different operation unit 102–112.

Alternatively or in addition, the workflow manager 114 can provide information to the workflow definition unit 116 to mark the display of the workflow (window 122) to indicate which operations have already been performed and which are currently available to be performed.

If the input to the selected device is available, the workflow manager 114 stores the name and version number, if any, of the selected device in the task information portion of workflow database 123 corresponding to the selected device for the current workflow. Subsequently, it initiates the selected device. If the selected device is an application package, it typically operates within a separate, typically full-sized, window. The user then performs whatever artwork preparation operations he desires, typically on high resolution artwork elements, such as the image 24, the mask and the layout page 21. For example, he might create the layout page 21.

Appendix A is an exemplary process list for the artwork preparation task of FIG. 2. For the sake of conciseness, the parameters of the tasks performed are not listed in the process list but, instead, are provided in FIGS. 6A–6M which are parameter screens of the application packages utilized for the example of FIG. 2. Appendix A indicates which screen is utilized when. As Appendix A and its corresponding FIGS. 6A–6M are believed to be self-explanatory, they will not be detailed herein.

In accordance with a preferred embodiment of the present invention, the selected device continually provides the workflow manager 114 with the operations performed, their parameters and the files which they create or on which they operate, if any. For example, if the device is an application package, it has a front and back end which communicate through APPLE EVENTS or similar commands.

The workflow manager 114 captures these commands, processes them and then stores them in the task information portion of workflow database 123 corresponding to the selected device for the current workflow.

Workflow manager 114 does not store a full history of the operations performed by the user. Instead, it processes the commands to ensure that it saves only the necessary commands to repeat the desired pre-press operations. For example, if the commands are opposite of each other, as is the case for DO and UNDO operations, the workflow manager 114 does not store either operation.

The workflow manager 114 also stores the names of output data files 127 (FIG. 4), such as layout 21 or image 24, in the record of job ticket database 121 for the specific job. They are typically stored in their native file format. Because a user may utilize more than one application package, each of which has its own native file format, the workflow manager 114 converts between file formats whenever it is necessary to do so.

If the operation is that of scanning a transparency, the scanner stores the resultant low and high resolution scanned images as part of data files 127 and provides the names of the files, the parameters of the scanning and the type and version of the scanner to the workflow manager 114 which stores them in workflow database 124.

If the operation is that of color correction to the scanned image, the results of the color corrections are displayed as part of the image manipulation application while the designer or production shop worker corrects the colors. Typically, only the color correction operations are listed in the portion of the workflow corresponding to color correction. The color corrected image need not be stored since it will be recreated, as described hereinbelow.

For those operations which are typically performed by the production shop, the artwork designer typically transmits the job data, including the database record, the output data files 123, if any, and the process list 126, to the production shop. The workflow manager 114 of the production shop updates the process list 126 and the database record with the operations performed at the shop. When the production shop finishes its work, it returns the database record and any newly created output data files to the artwork designer.

The transmission can be of any suitable type, such as via magnetic tape, a network or a direct digital link. If the artwork designer and the production shop are connected via a network, then they typically work on the same workflow manager 114.

If the selected device is the one which performs rasterization, the workflow manager 114 first checks that all the operations of the current workflow, except the output operations, have been performed. If so, it creates a process list 126 (FIG. 4) comprising sets of task information from at least some of the operations of the current workflow which are performed by application packages, where the order of the sets of task information is determined by the workflow. The task information comprises the commands and their parameters. The set of commands for each application package are preceded by a command to load the application package. The workflow manager 114 then loads interpreter 118 and provides it with the process list 126.

When creating the process list 126, the workflow manager 114 operates to produce as efficient a process list 126 as possible. Thus, the workflow manager 114 modifies the task information and rearranges the order in which operations of the workflow are performed.

The workflow manager 114 combines operations which the user performed in two steps, but which constitute a single, known operation. For example, a gradation operation followed by a color correction operation can be combined into a single operation. In another example, a user might have changed the color of an element from a first color to a second color. Some time later, he may have changed the second color to a third color. The workflow manager 114 will provide a command for a change from the first to the third color.

As mentioned hereinabove, the workflow manager 114 streamlines the operations in the process list 126 by first reviewing them and changing the order of operation to a more efficient operation. For example, it is more efficient to rearrange the order of the mask and color correction steps (steps 34 and 32, respectively) such that the color correction is performed only on the part of the image remaining after masking.

If the user has saved an intermediate file, the workflow manager 114 only includes those operations of the workflow which occur after the operation in which the intermediate file was saved. By saving intermediate files, the user can increase the speed with which the interpreter 118, which operates on the process list 126, performs.

The interpreter 118 calls the back end of each application listed in the process list 126 with the appropriate commands from the process list 126. The interpreter 118 provides each command in the order listed in the process list 126.

Once interpreter 118 finishes performing the commands in the process list 126, interpreter 118 rasterizes the page, formed of graphical, textual and raster image elements, producing a rasterized image file which can be stored or utilized to create physical output via devices such as the plotter or proofer.

It will be appreciated that, by calling the back ends of the application packages, interpreter 118 performs each operation in accordance with the same technology of the application which originally performed the operation.

It will further be appreciated that the interpreter 118 and the previewer 119 are very similar in operation; the difference being that the previewer 119 only operates on low resolution versions of the input artwork elements and only provides output to the preview window 124, which typically occupies only a portion of the screen or of the artwork. Previewer 119 provides capabilities to change the size and shape of preview window 124 and to zoom and pan the image in the window 124. If the image displayed is only a portion of the artwork, the previewer 119 only operates on the relevant portion of the input artwork elements.

When the preview window 124 is selected, it provides the user (either designer or production shop worker) with some idea of what the final artwork will look like. During the initial pass through the workflow, the displayed artwork shows the user what has been produced up until the operation he is working on. During correction cycles, preview window 124 displays the effect of the correction on the final result, thereby providing relatively quick feedback to the user.

Whenever the preview window 124 is selected, the workflow manager 114 produces the process list 126, as described hereinabove, for those operations which have already been performed. Afterward, while the users perform operations, the workflow manager 114 continually updates the process list 126 with the commands received.

It will be appreciated that the workflow and the corresponding task information is an editable description of the artwork preparation operations performed. Therefore, if either the artwork designer or the production shop worker must correct the job, he does so by indicating the workflow to be edited, initiating the appropriate operation unit 102–112 and making the desired change. In the example of changing the T to a Y, the designer would open the same layout device 108 as originally selected and would edit the T to a Y.

The selected operation unit 102–112 provides the new command (change T to Y) to the workflow manager 114. The workflow manager 114 utilizes the workflow and block identifiers to determine which operation should be amended and then performs the following operations: reviews the task information for the text edit operation, finds the command which created the T, deletes it and puts in the command to create the Y. If the preview window 124 is selected, the workflow manager 114 also updates the process list 126 with the changed command.

The workflow manager 114 does not change any other task information. If a new operation is performed, rather than correcting an old one, the workflow manager 114 edits the current workflow to include the new operation. Alternatively, or in addition, a user can manually edit the process list 126.

The previewer 119 executes all of those commands listed in the process list 126. It will be appreciated that, because of the previewer 119, the present invention reduces the time needed for design changes. With the previewer 119, the user, usually the designer, only has to make the significant changes to the design. The remaining operations which have to be performed in order to complete the job (such as redoing the neon effect around the Y) are immediately performed for the designer by the previewer 119. The interpreter 118 interprets the process list 126 only when output is desired.

If the designer so desires, the workflow manager 114 can also queue a batch operation to perform those operations of the workflow which occur after the rasterization operation. In the example of FIG. 2, these are the trap and plot operations (steps 50 and 52). The information to do so is stored in the workflow database 123.

It will be appreciated that the record in the workflow database 123 can be reutilized, either as a template for similar types of operations or to reproduce the same job.

The workflow manager 114 also provides database management tools to enable the users, particularly the production shop workers, to operate on several jobs at one time. Some of the tools include file tracking, creating status reports and creating schedules.

It will be appreciated by persons skilled in the art that the present invention is not limited to what has been particularly shown and described hereinabove. Rather the scope of the present invention is defined by the claims which follow after Appendix A:

Appendix A

Process Number:30
Process Name: Scan
Process: Smart Scanner/Macintosh
Application: Smart Plus 3.0
Dialog Box FIG. 6A
Start operations
Application:Smart Plus 3.0
set Media
set Format
set Scan Type
set Crop/Scan (x1,y1 to x2,y2)
set resolution (Depending on the type of scan, there might be a need to edit Gradation, Sharpness and Color Tables)
Save Scan (FIG. 6B)
Process Number:32
Process Name: Color Correction
Device:Macintosh
Application: Adobe PhotoShop 2.5
Dialog Box FIG. 6C
Start operations
Open File
open change color
set "amount" of change
Process Number:34
Process Name: Mask
Device: Macintosh
Application: Adobe PhotoShop 2.5
Start operations
Create the clipping path around the image
line from x3,y3 to x4,y4
end of mask at x5, y5
Save the path (FIG. 6D)
Save the path in the clipping path (FIG. 6E)
Save the file as an EPS
Process Number:36
Process Name: Create Layout
Device: Macintosh
Application: Quark Express 3.11
Start operations
Open Quark Express 3.11
Create a new page
set page size
Process Number:38
Process Name: shape Create (Picture and Text Boxes)
Device: Macintosh
Application: Quark Express 3.11
Start operations
create picture box
create picture box tool
create box from x6,y6 to x7,y7
create text box
select text box tool
create box from x8,y8 to x9,y9
Process Number:40
Process Name: Assign Picture
Device: Macintosh
Application: Quark Express 3.11
Start Operation
assign picture
save
Process Number: 42
Process Name: Create Text
Device: Macintosh
Application: Quark Express 3.11
Start operation
type in text
Process Number: 44
Process Name: Convert to Vector
Device: Macintosh
Application: Freehand 3.11
open application
set page size
open text tool
type in "T"(FIG. 6F)
set parameters set font (FIG. 6G)
set size
set color (FIG. 6H)
place "T" on page
create eps (FIG. 6I)
save file
Process Number: 45
Process Name: Neon Effect
Device: Macintosh
Application: Adobe PhotoShop 2.5
Start operation
open scan
place vector file ("T") on scan
select "T"
apply neon filter
set color
set width
set blend
Process Number: 48
Process Name: RIP
Device: Macintosh
Application: VIP 1.5
Dialog Box FIG. 6J
Start operation
open application
add file to queue
Set parameters
set offset
set scale
set LW and CT resolution
set rotate
set flip
process
Process Number: 50
Process Name: Trap
Device: Macintosh
Application: FAF for Macintosh
Dialog Box FIG. 6K, L
Start operation
add LW to queue
set default parameters
process
Process Number:52a
Process Name: Proof
Device: Macintosh/Iris Smart Jet 4012
Application: Smart VIP 1.2
Dialog Box FIG. 6M
Start operation
add file to queue
set color balance
set color taples
set scale
process
Process Number: 52b Process Name: Plot
Device: Dolev/Macintosh
Application VIP 1.5
Dialog Box FIG. 6N
Start operation
Open Application
Add file to queue
se format
process
END

I claim:

1. An artwork design and production system comprising:
    a plurality of operation units each of which performs at least one of a multiplicity of different artwork preparation tasks and an artwork preparation administrator, the art work preparation administrator comprising:
    a workflow definition unit including a user-interface for receiving a user-defined workflow including selected artwork preparation tasks and the order of operation thereof, said user initiating a first cycle of operation of said operation units performing said selected artwork preparation tasks which process a first version of a digital representation of said artwork, thereby producing a second version of said digital representation and an actual workflow;
    means for initiating operation of operation units performing said selected artwork preparation tasks; and
    an artwork workflow manager operative upon receiving an indication from said user viewing said second version of said digital representation, said artwork workflow manager automatically analyzes said actual workflow and determines whether to initiate a second cycle of operation more efficiently than said first cycle.

2. A method of designing and producing artwork, the method comprising the steps of:
    providing a plurality of operation units each of which performs at least one of a multiplicity of different artwork preparation tasks;
    defining a user defined workflow including selected artwork preparation tasks and the order of operation thereof;
    initiating a first cycle of operation of selected operation units performing said selected artwork preparation task which process a first version of a digital representation of said artwork, thereby producing a second version of said digital representation and an actual workflow;
    automatically analyzing said actual workflow upon receiving an indication from said user viewing said second version of said digital representation; and
    determining whether to initiate a second cycle of operation more efficiently than said first cycle.

* * * * *